United States Patent
Xia et al.

(10) Patent No.: US 11,875,250 B1
(45) Date of Patent: Jan. 16, 2024

(54) DEEP NEURAL NETWORKS WITH SEMANTICALLY WEIGHTED LOSS FUNCTIONS

(71) Applicant: Amazon Technologies, Inc., Seattle, WA (US)

(72) Inventors: Wei Xia, Seattle, WA (US); Meng Wang, Seattle, WA (US); Weixin Wu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1302 days.

(21) Appl. No.: 15/627,330

(22) Filed: Jun. 19, 2017

(51) Int. Cl.
*G06N 3/08* (2023.01)
*G06N 3/04* (2023.01)
*G06F 16/583* (2019.01)

(52) U.S. Cl.
CPC ............. *G06N 3/08* (2013.01); *G06F 16/583* (2019.01); *G06N 3/04* (2013.01)

(58) Field of Classification Search
CPC ........... G06N 3/08; G06N 3/04; G06N 3/063; G06N 3/082; G06N 20/00
USPC .......................................................... 706/25
See application file for complete search history.

(56) References Cited

U.S. PATENT DOCUMENTS

| | | | |
|---|---|---|---|
| 6,038,337 A | 3/2000 | Lawrence et al. | |
| 8,234,228 B2 | 7/2012 | Weston et al. | |
| 8,442,321 B1 | 5/2013 | Chang et al. | |
| 9,552,549 B1 * | 1/2017 | Gong | G06N 3/045 |
| 9,928,448 B1 * | 3/2018 | Merler | G06F 18/2415 |
| 10,176,245 B2 * | 1/2019 | Lim | G06F 16/285 |
| 10,410,096 B2 * | 9/2019 | Dijkman | G06V 20/35 |
| 10,510,000 B1 * | 12/2019 | Commons | G06N 3/045 |
| 2014/0142929 A1 | 5/2014 | Seide et al. | |
| 2015/0379424 A1 | 12/2015 | Dirac et al. | |
| 2017/0344884 A1 * | 11/2017 | Lin | G06N 3/048 |
| 2018/0121768 A1 * | 5/2018 | Lin | G06F 18/214 |
| 2018/0260668 A1 * | 9/2018 | Shen | G06V 10/56 |
| 2018/0285682 A1 * | 10/2018 | Najibi | G06N 3/084 |

FOREIGN PATENT DOCUMENTS

| | | |
|---|---|---|
| CN | 104112113 A | 10/2014 |
| EP | 2833295 A3 | 2/2015 |

OTHER PUBLICATIONS

Wang et al.—"Learning Deep Representations for Scene Labeling with Semantic Context Guided Supervision"—Jun. 9, 2017—https://arxiv.org/pdf/1706.02493.pdf (Year: 2017).*
Yan et al.—"Semantic indexing with deep learning: a case study"—2016—https://bdataanalytics.biomedcentral.com/track/pdf/10.1186/s41044-016-0007-z.pdf (Year: 2016).*
Liberda et al.—"Image segmentation and convolutional neural networks as tools for indoor scene understanding"—2016—https://publications.lib.chalmers.se/records/fulltext/242058/242058.pdf (Year: 2016).*

(Continued)

*Primary Examiner* — Viker A Lamardo
(74) *Attorney, Agent, or Firm* — Robert C. Kowert; Kowert, Hood, Munyon, Rankin & Goetzel, P.C.

(57) ABSTRACT

An indication of semantic relationships among classes is obtained. A neural network whose loss function is based at least partly on the semantic relationships is trained. The trained neural network is used to identify one or more classes to which an input observation belongs.

21 Claims, 10 Drawing Sheets

(56) References Cited

OTHER PUBLICATIONS

U.S. Appl. No. 15/045,030, filed Feb. 16, 2016, Chatterjee, et al.
Amazon Web Services, Amazon Machine Learning Developer Guide, Feb. 9, 2016, pp. 1-140.
Neural Network Basics, "A Basic Introduction to Feedforward Backpropagation Neural Networks," David Leverington, Associate Professor of Geosciences, downloaded from http://www.webpages.ttu.edu/dleverin/neural_network/heural_networks.html, Feb. 2, 2016, pp. 1-33.
"Gradient-Based Learning Applied to Document Recognition," Yann LeCun, et al., Proc. of the IEEE, Nov. 1998, pp. 1-46.
"ImageNet Classification with Deep Convolutional Neural Networks," Alex Krizhevsky, et al., 2012, pp. 1-9.
Wikipedia, "Convolutional neural network," Jan. 19, 2016, pp. 1-9.
"Best Practices for Convolutional Neural Networks Applied to Visual Document Analysis," Patrice Y. Simard, et al., Microsoft Research, One Microsoft Way, Redmond WA 98052, 2003, pp. 1-6.
Amazon Web Services, "Amazon Rekognition Developer Guide", API Version Apr. 19, 2017, pp. 1-169.
U.S. Appl. No. 14/980,898, filed Dec. 28, 2015, Weixin Wu et al.
U.S. Appl. No. 14/982,816, filed Dec. 29, 2015, Weixin Wu et al.

\* cited by examiner

DEEP NEURAL NETWORKS WITH SEMANTICALLY WEIGHTED LOSS FUNCTIONS

BACKGROUND

As the costs of data storage have declined over the years, more and more data pertaining to a wide variety of applications can potentially be collected and analyzed using increasingly sophisticated machine learning algorithms. For example, deep neural network models have been trained to perform a variety of complex tasks, such as machine translation, image recognition, and so on. Supervised machine learning models, including neural networks used for classification, are often trained iteratively. In each iteration, a loss function representative of the differences between the "ground truth" and the predictions of the model may be computed, and used to modify various parameters (such as weights or biases of the artificial neurons at different layers) of the model for the next iteration. Unfortunately, in many cases, simplistic assumptions made in the loss functions may result in long model convergence times, wasted training resources or sub-optimal classification accuracy of the models.

Figure 1:
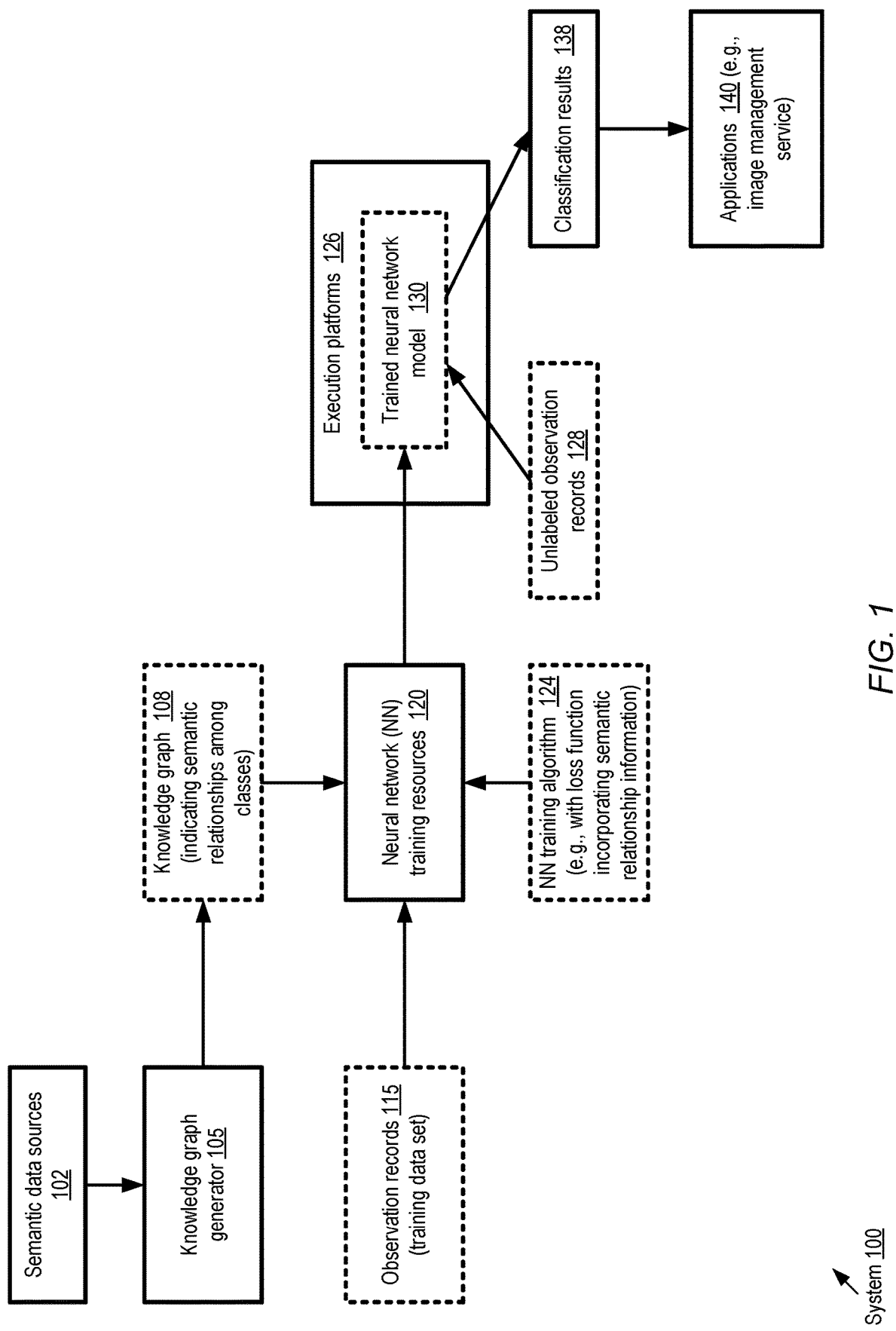
FIG. 1 illustrates an example system environment in which a neural network model whose loss function takes semantic relationships among classes into account may be used for classification, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for training and utilizing deep neural network-based models whose loss functions take semantic information into account are described. In at least some embodiments, the models may be used to classify input data records—e.g., to identify which, if any, of a set of classes is represented in a given input data observation. According to one embodiment, a method may comprise obtaining an indication of semantic relationships among a plurality of such classes, e.g., with the help of a natural language processing (NLP) subsystem or service which may produce a knowledge graph representation of such relationships. The method may further comprise training a neural network model using a loss function which is based at least in part on the semantic relationships in some embodiments. Any of a variety of training algorithms may be used in different embodiments, such as variants of stochastic gradient descent. In one embodiment, after the neural network is trained, it may be used to identify one or more classes to which a given unlabeled input observation belongs.

In some embodiments, the indication of semantic relationships may, for example, comprise a matrix of semantic distance values corresponding to pairs of classes. The semantic distance between a pair of classes may, for example, vary inversely with the closeness of the relationship between the meanings of the classes in some embodiments: for example, the semantic difference between a class representing the animal "cat" and a class representing the animal "dog" may be greater than the semantic distance between the class for "poodle" and the class for "dog" (since a poodle is a kind of dog). In one embodiment, as part of a training iteration of the neural network, a difference vector may be computed between a ground truth vector corresponding to a given training observation and an output vector produced at a particular layer of the neural network. The difference vector (which may represent the baseline or raw classification error with respect to the training observation) may in one embodiment be multiplied with the matrix of semantic distances, obtaining a semantically-weighted loss vector, which may then be used to modify parameters (such as weights, biases etc.) at one or more layers of the neural network. By multiplying the raw difference vector with the matrix of semantic distances, semantic similarity may be added as a factor in computing the losses due to classification errors in such embodiments. In effect, in such an embodiment the neural network model may be penalized less for a classification error in which class C1 is predicted/identified as class C2 if the semantic distance between C1 and C2 is small, than for a classification error in which the semantic distance between C1 and C2 is large. In other embodiments, other approaches to the inclusion of semantic information in loss calculations may be used—e.g., multiplying a loss vector with a matrix of semantic distances may not be required. In some embodiments, using the semantic information may help reduce the number of classification errors made by the model, especially with regard to observations that lie close to the class boundaries (hyper-planes in the multi-dimensional space representing the data), or at least make some such errors easier to interpret. In one embodiment, faster convergence of the model may be achieved as a result of incorporating semantic information into the loss function.

A variety of neural network models may utilize the semantic relationship information for loss-related computations as described above in some embodiments. For example, in one embodiment, a neural network model which is used for object recognition or image recognition may comprise a loss layer in which semantic information is used. Such a neural network may, for example, comprise one or more convolutional layers, one or more pooling layers, and/or one or more fully connected layers of neurons. In other embodiments, neural networks which do not necessarily include convolutional, pooling or fully-connected layers may be employed. In at least one embodiment, a machine learning model which does not necessarily include a neural network may utilize semantic relationship information in a similar manner to that described above with respect to neural network models—e.g., the machine learning model may also use a loss function whose computations are based at least in part on the semantic relationship information.

In some embodiments, a method may comprise generating a knowledge graph which represents semantic information to be used for the loss-related computations at a machine learning model. An indication of a set of seed terms to be used to initiate a process for generating the knowledge graph may be obtained in one such embodiment. Using the set of seed terms and one or more semantic data sources (such as publicly-available or privately-available lexical databases, ontologies, dictionaries, or encyclopedia-derived concepts), a sparse knowledge graph may first be constructed as described below in further detail, from which a dense knowledge graph may be generated and provided for use in the training of the machine learning model.

The semantic relationship information may be used for a variety of applications or services in different embodiments, e.g., in addition to the training of the neural network itself. In one embodiment, a tool or service for improving the quality or coverage of training data may be implemented. An indication of an initial set of target classes into which a set of input observations is to be classified may be obtained at such a tool in some embodiments, e.g., via a programmatic interface such as an application programming interface (API), a web-based console, a command-line tool or a graphical user interface. Using the target classes and the semantic relationship information, a training coverage set comprising a set of labels related to the target classes (e.g., the initial target classes, as well as classes similar to the initial target classes) may be identified in one embodiment. A pool of labeled input observation records may then be examined, and a training data set which includes at least one training example corresponding to individual labels of the training coverage set may be selected from the input observations in some embodiments. Such a training set may then be used to train the neural network model to be used for classification in one embodiment. As a result of using the semantic relationship information, in one embodiment examples of a larger set of related classes may be identified than were indicated in the initial set, leading to a more comprehensive training data set which in turn may lead to a model with better generalization capability.

In some embodiments, semantically-weighted loss functions may be used for machine learning models implemented at one or more network-accessible services of a provider network or public cloud environment. In one embodiment, a representation of an image may be obtained at an image management service of a provider network, and a trained neural network whose loss function is based on semantic relationships may be used to generate one or more tags or labels for the image. The image management service may receive a query to identify images similar to a given image with a particular tag (which may have been determined using the trained neural network) in some embodiments. In one such embodiment, the semantic relationship information may be used to identify one or more related tags which were associated with respective images of an image collection using the trained neural network. One or more images selected using the related tags may be provided to respond to the query for similar images in some embodiments.

In some embodiments, a recognition service may be implemented with the help of trained neural networks whose loss function incorporate semantic relationship information. The recognition service may utilize the trained neural networks, for example, to identify and provide images for which target classes indicated in a recognition query, and/or to identify types of objects or concepts detected within supplied images. For example, in one embodiment, a query indicating a target class "sunset" may be submitted to the recognition service, and a set of images of sunsets or other related concepts may be provided in response. In some embodiments, the trained neural network may be used to provide hierarchical relationship information about classes of objects which may be recognized within input data in response to a programmatic request. In some embodiments, respective confidence scores associated with different classes may be provided as part of the output of the trained model. In one embodiment, the trained neural network may be used to perform moderation with respect to images or other content items—e.g., a moderation label for a given image, indicating whether the image is suitable for viewing by a target audience, may be generated using the trained neural network.

Example System Environment

FIG. 1 illustrates an example system environment in which a neural network model whose loss function takes semantic relationships among classes into account may be used for classification, according to at least some embodiments. As shown, system 100 may comprise one or more semantic data sources 102, a knowledge graph generator 105, neural network training resources 120, and one or more execution platforms 126 at which trained neural network models may be executed in the depicted embodiment. A semantic data source 102, knowledge graph generator 105, training resource 120 and/or execution platforms 126 may be implemented using one or more computing devices in some embodiments, e.g., employing some combination of hardware and software resources.

Semantic data sources 102 may provide information about the meanings and usages of various terms which correspond to classes or categories to be identified among input observations using machine learning in the depicted embodiment. Given a set of seed words associated with a particular problem domain for which classification of input records may be needed, and given information obtained from the semantic data sources 102, in some embodiments a knowledge graph generator 105 may produce a corresponding knowledge graph 108. The knowledge graph 108 may comprise information about various types of semantic relationships among pairs of classes in the depicted embodiment, such as whether a given term corresponding to a class is an ancestor of another term, a sibling, a descendant, or unrelated to the other term. Various types of persistent representations of the information incorporated within knowledge graphs 108 may be generated in different embodiments. In one embodiment, for example, at least a portion of the information contained within a knowledge graph may be expressed as a matrix of semantic distances (or similarity/dissimilarity scores) between pairs of classes (or terms).

A representation of the knowledge graph 108, together with a training data set comprising a plurality of observation records 115 may be used to train a neural network model 130 using training resources 120 in the depicted embodiment. The neural network training algorithm 124 employed (e.g., a variant of stochastic gradient descent) may employ a loss function which is based at least in part on the semantic relationship information in at least some embodiments. After the model 130 is trained, it may be run at one or more execution platforms 126 in the depicted embodiment, e.g., in response to various types of queries or requests which indicate respective sets of one or more input unlabeled observation records 128 for which classification is to be performed. In some embodiments, the output of the execution of the trained model 130 may comprise classification results 138 indicating one or more classes to which an individual observation record belongs.

In some embodiments, the classification results 138 may be provided or transmitted to one or more applications 140, such as an image management service where the results may for example be use to tag images based on the classes identified in the input data, to identify similar images based on semantic relationships, and so on. In one embodiment, an unlabeled observation record 128 may be submitted to a machine learning service via a programmatic interface by a client of the service, and the classification results (e.g., a list of identified classes with associate classification scores) may be provided back to the clients programmatically by the service. In some embodiments, the semantic analysis provided by the trained neural network model 130 may be used for content moderation—e.g., a moderation label indicating whether a given set of unlabeled data is suitable for viewing by a particular audience may be generated using the classification results. Classification results 138 may be used for a wide variety of applications (e.g., other than image-related applications) in some embodiments.

Example Neural Network Model

Figure 2:
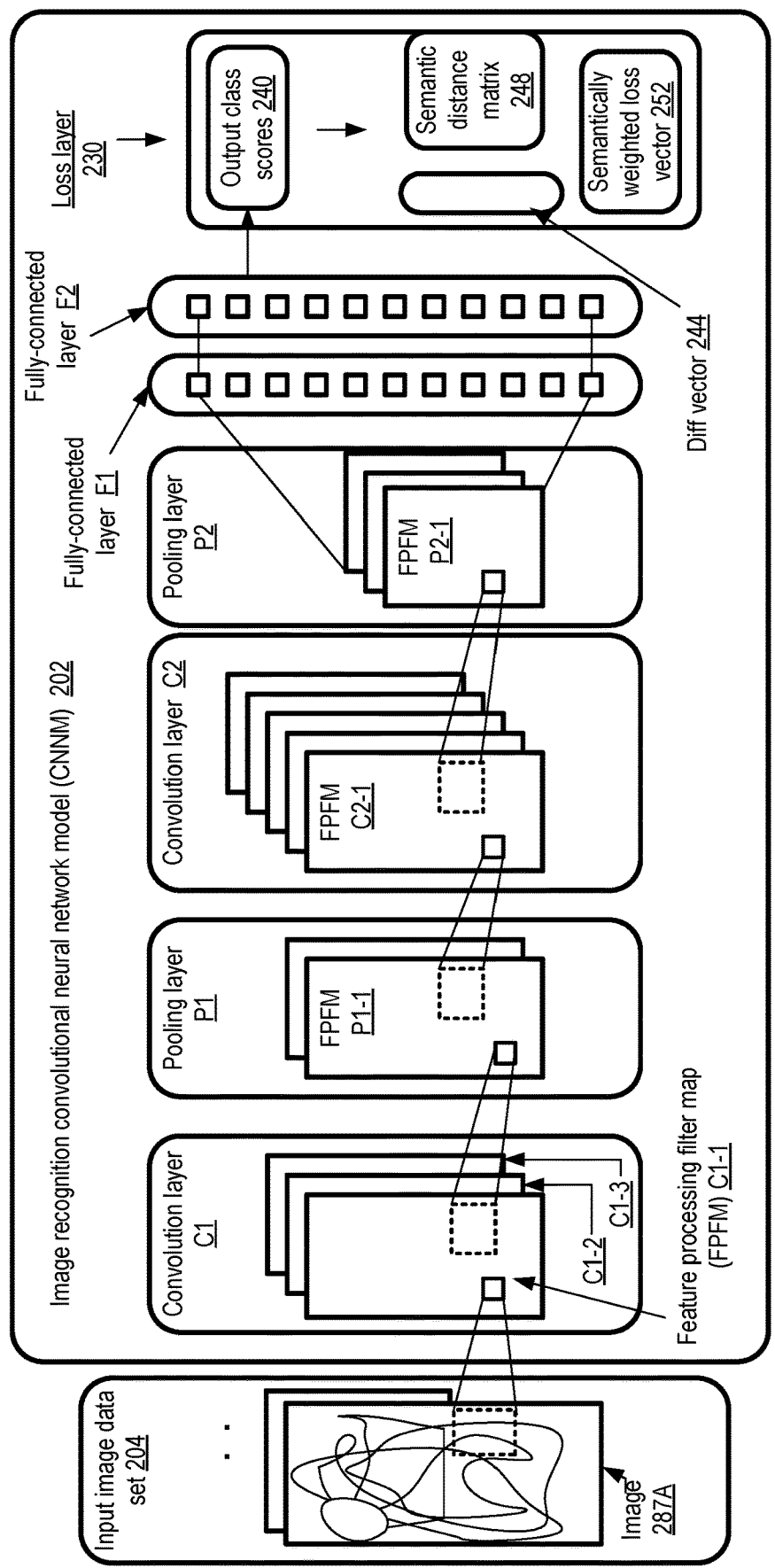
FIG. 2 illustrates an example deep neural network with a loss layer in which semantically-weighted losses may be computed, according to at least some embodiments.

FIG. 2 illustrates an example deep neural network (DNN) with a loss layer in which semantically-weighted losses may be computed, according to at least some embodiments. Many machine learning problems such as object recognition, face recognition, anomaly detection and the like may be addressed in various embodiments by training sophisticated multi-layer models which incorporate semantic information using the techniques discussed above. For example, convolutional neural network models have been known to work well for object recognition within images, and one such model is shown in FIG. 2. An image data set 204 comprising a plurality of images 287 (e.g., 287A) is used as input to an image recognition convolutional neural network model 202 in the depicted embodiment. For a given image 287, the model 202 may produce a probability distribution corresponding to a set of target objects of respective classes in one embodiment, indicating the relative probability that the image comprises each one of the objects or classes. For example, the output class scores 240 for image 287A may indicate that, in a test run conducted after model 202 has undergone a number of training iterations, a score or probability of 0.4 (40%) may be assigned to the scenario that image 287A includes a representation of a boat. Respective scores or probabilities of 0.3 (30%), 0.15 (15%) and 0.15 (15%) may be assigned to the scenario that image 287A comprises a representation of a house, a car or a dog. In the depicted example scenario, "boat", "house", "car" and "dog" may represent the set of classes for which examples may have been identified with some non-zero probabilities in the input data.

In some embodiments, the output produced by the model (e.g., the respective probabilities or scores 240 for different objects or classes) may change from one test run to another. In contrast to training runs, in one embodiment a test run may only require one feed-forward processing phase of the model (using the parameter values that have been identified via the training conducted thus far); as such, a given test run may not require multiple iterations. At least for some types of image recognition models the respective probabilities for different objects need not add up to 100% (e.g., a given image may comprise both a car and a boat) in some embodiments.

In the depicted embodiment, a convolutional neural network model such as model 202 used for object recognition may combine the concepts of local receptive fields, shared or replicated weights, and spatial or temporal sub-sampling. The model 202 may comprise a number of layers in the depicted embodiment, such as convolution layers C1 and C2, pooling or sub-sampling layers P1 and P2, and fully-connected layers F1 and F2. With respect to the convolution layers and the pooling layers, a given layer may comprise a number of units (logically representing respective artificial neurons being trained) in some embodiments, with each unit receiving input from a small set of units located in a common neighborhood in the previous layer. This approach towards local receptive fields may be modeled on the manner in which the neurons of the visual system of various animal species work. With such local information, the neurons at a given layer may eventually learn to recognize elementary visual features such as corners, endpoints, boundaries, etc. in various embodiments. Such elementary features may then be combined in subsequent layers of the model in the depicted embodiment to form higher-order features (e.g., doors, windows, etc. in the case of an image of a house). Elementary feature detectors useful in one part of an image 287 may be equally useful in detecting similar features in other parts of the image in one embodiment, so sets of units assigned different parts of the image within a given layer may be assigned identical weights in at least some embodiments. Units in a given layer may be may be referred to as feature processing filter maps (or simply as filter maps) in the depicted embodiment, with the outputs from the filter maps being referred to as feature maps. Units in a filter map may perform similar operations on different parts or neighborhoods of the image in some embodiments. In one embodiment, a convolution layer such as C1 or C2 may comprise several filter maps (e.g., filter processing feature maps or FPFMs C1-1, C1-2, C1-3 of convolution layer C1) with respective weight vectors, so that several different types of features may be extracted at the convolution layer. The receptive fields of nearby units may overlap in some embodiments, again mimicking the manner in which the receptive fields of biological neurons overlap.

Once a feature has been detected, its absolute position within the image being analyzed may become less important than the approximate relative position of that feature with respect to other detected features in some embodiments. For example, if a mouth is detected as a feature of a human face, its position relative to the nose and eyes may be more important than the exact location of the mouth within the image. Keeping track of the precise positions of different visual features may, in one embodiment, actually be detrimental to recognizing higher-level objects, because the precise positions of the features may vary across different images. Pooling or sub-sampling layers (such as layers P1 and P2 in FIG. 2, each of which may include respective feature processing filter maps such as FPFMs P1-1, P2-1, etc.) may be used to reduce the precision with which the positions of various identified features are represented in the filter maps in the depicted embodiment. For example, the average output of some number of neighboring units of the filter maps of the previous convolution layer (e.g., C1 in the case of P1) may be computed at the filter maps of the pooling layers. Successive layers of convolution and pooling layers may be alternated in the model 202 in the depicted embodiment, for example with the number of filter maps increasing in each layer and the spatial resolution decreasing in each layer. To produce the final output of the model one or more fully-connected layers such as F1 and F2 may be implemented in some embodiments, in which inputs from all the units of the previous layers are combined at each unit to derive the model predictions.

In the embodiment depicted in FIG. 2, a difference vector 244 representing the classification errors with respect to the ground truth for a given input image such as 287A may be calculated at the loss layer 230 of the model 202. The elements of the vector may correspond to the different classes of objects for which the model 202 is being trained in some embodiments. Using a knowledge graph or some other source of semantic relationship information, a semantic distance matrix 249 may be obtained in the depicted embodiment, which indicates the relative similarities and/or differences between pairs of the classes. The information in the semantic distance matrix and the difference vector may be aggregated or combined in one embodiment, e.g., by multiplying the difference vector with the distance matrix, to obtain a semantically-weighted loss vector 252. The semantically-weighted loss vector may then be used to modify parameters such as weights and biases at various layers of the model 202 in the depicted embodiment, e.g., using a backpropagation technique. As discussed in further detail below, the semantic weighting of the losses may result in smaller penalties (and hence smaller parameter changes) for classification errors involving similar classes than the penalties applied for errors involving dissimilar classes. It is noted that the convolutional neural network 202 shown in FIG. 2 represents only one example of the kinds of neural networks into which semantic information may be incorporated in various embodiments; the techniques described for including semantic information in loss computations or functions may be applied with equal success to other types of neural networks or other machine learning models in some embodiments.

Example Semantic Graph

Figure 3:
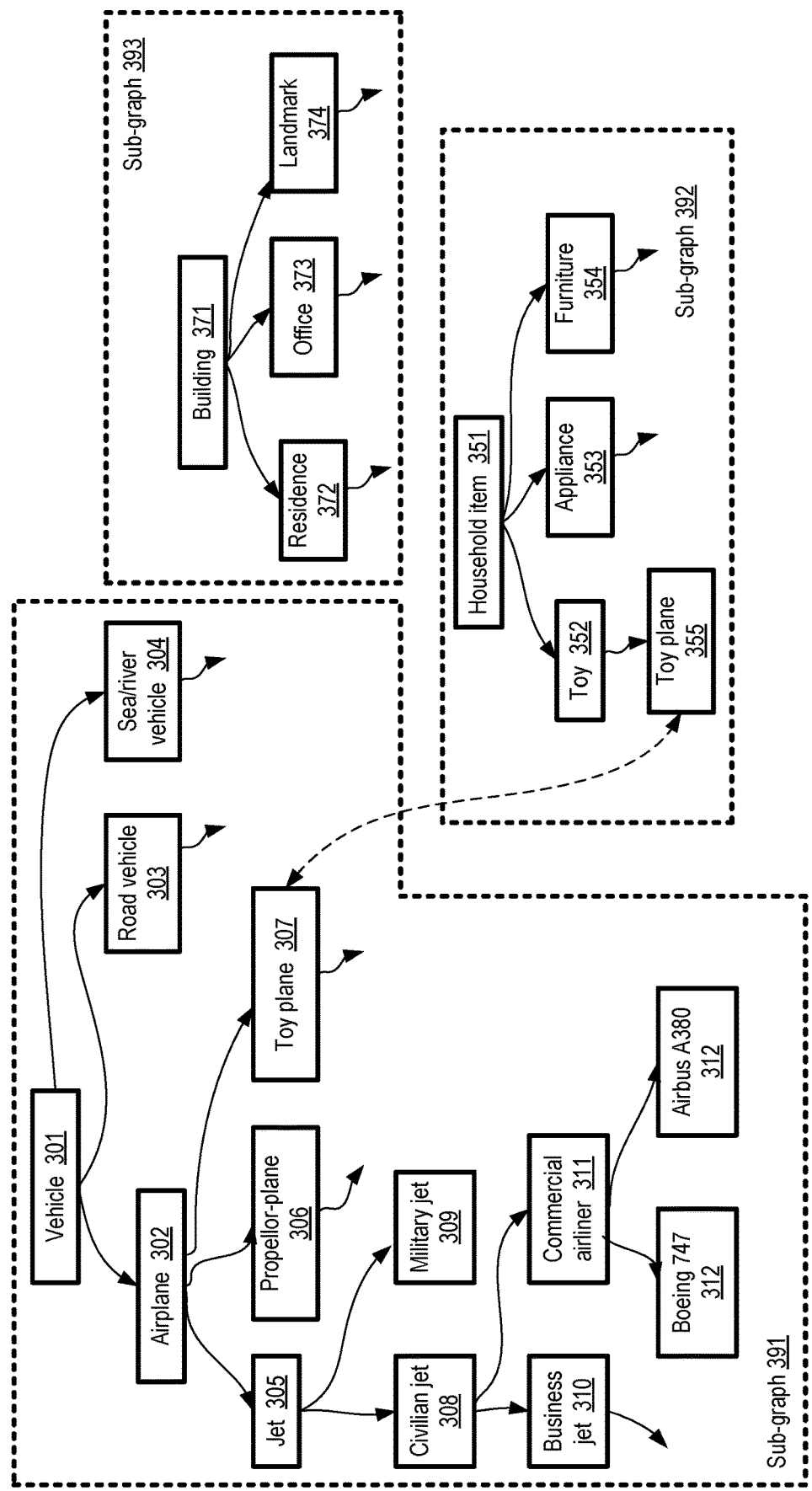
FIG. 3 illustrates an example semantic graph indicating relationships between various classes for which a neural network based classifier may be used, according to at least some embodiments.

FIG. 3 illustrates an example semantic graph indicating relationships between various classes for which a neural network based classifier may be used, according to at least some embodiments. In the depicted embodiment, a semantic graph may comprise at least three sub-graphs 391, 392 and 393. Sub-graph 391 may represent semantic relationship information associated with vehicles, as suggested by the label of the root node 301. Sub-graph 392 may represent semantic relationship information associated with household items as indicated by the label of node 351, while sub-graph 393 may encode semantic relationship information associated with buildings as indicated by the label for root node 371. Each sub-graph may comprise a plurality of nodes representing respective classes linked to a corresponding root node in the depicted embodiment, with the degree of specificity of the class generally increasing with the distance from the node. For example, the class of vehicles 301 may comprise classes of airplanes 302, road vehicles 303 and sea/river vehicles 304. Airplanes 302 may in turn comprise jets 305, propeller planes 306 and toy planes 307. Jets 305 may comprise civilian jets 308 and military jets 309, civilian jets 308 may comprise business jets 310 and commercial airliners 311, commercial airliners may include Boeing 747s 312 and Airbus A380s 313, and so on.

The edges of the graph may indicate hierarchical containment or ancestry relationships, while nodes at the same level with a common parent (such as airplanes 302, road vehicles 303 and river/sea vehicles 304) may represent sibling relationships. In the building-related sub-graph 393, for example, residences 372, office buildings 373 and landmarks 374 may represent siblings which are children of the building class 371. In the household items sub-graph 394, toy 352, appliance 353 and furniture 354 may be sibling children of the parent class household item 351, while toy airplane 355 may be a child of the toy class.

In some embodiments, numerical weights may be attached to the edges and/or associated with sibling nodes, indicating the relative strengths of the relationships. As indicated by the arrow between nodes 307 and 355, some semantic relationships or similarities may exist across sub-graph boundaries in the depicted embodiment. The information represented in semantic graphs similar to those shown in FIG. 3 may be used to help train neural network models in one embodiment, e.g., using a semantic distance matrix generated based at least partly on the graphs. In at least some embodiments, relationship information of the kind illustrated in FIG. 3 may be systematically generated and stored in the form of knowledge graphs as discussed below in further detail.

Knowledge Graph Preparation

Figure 4:
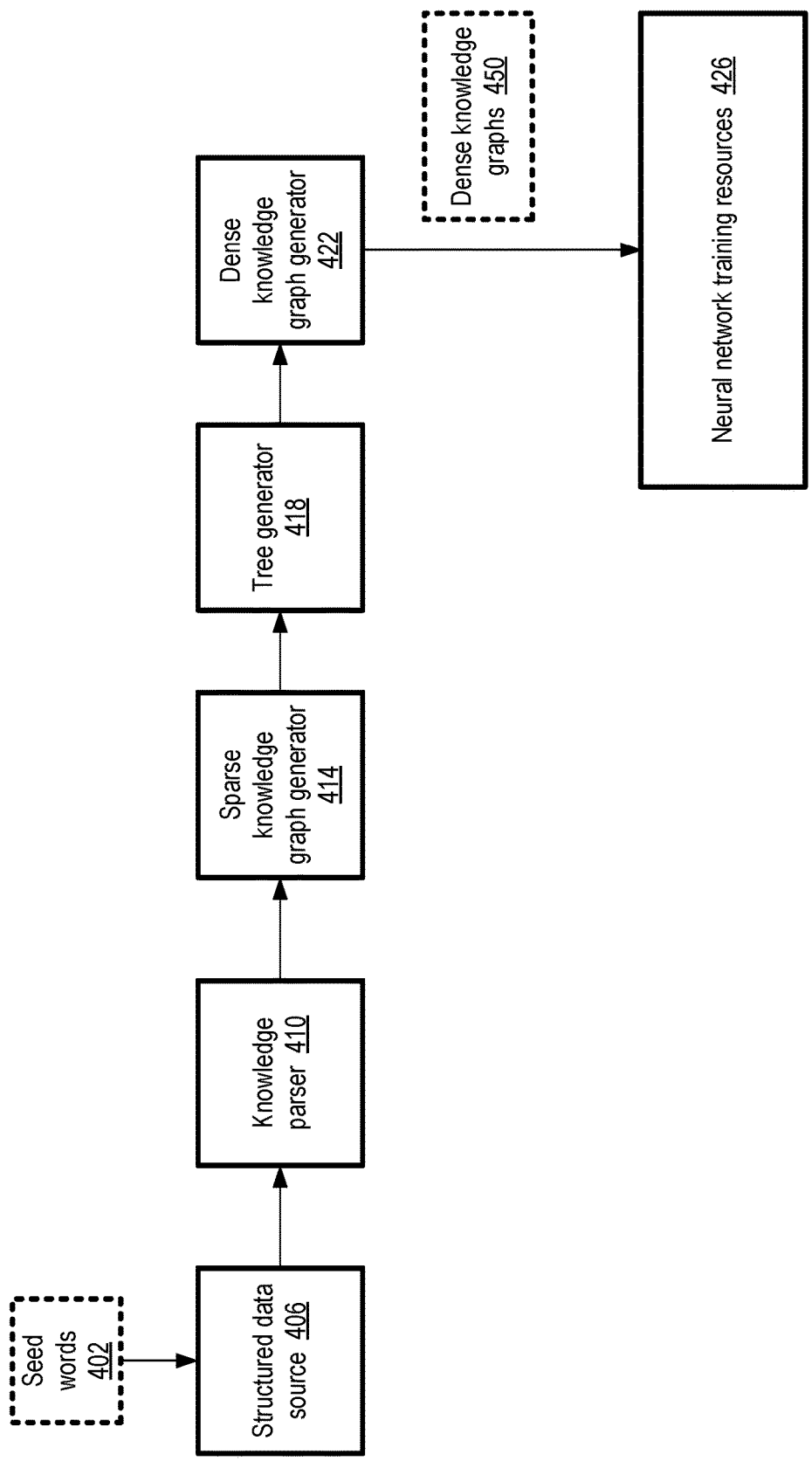
FIG. 4 illustrates an overview of an example workflow for generating a knowledge graph which may be used to provide semantic information for a classifier, according to at least some embodiments.

FIG. 4 illustrates an overview of an example workflow for generating a knowledge graph which may be used to provide semantic information for a classifier, according to at least some embodiments. In the depicted embodiment, one or more seed words or terms 402 associated with the problem domain for which a knowledge graph is to be generated may be provided as input to a structured data source 406, e.g., by one or more computing devices of a natural language processing (NLP) subsystem or a machine learning service. The seed words may, for example, represent high-level concepts (such as "vehicle", "building", "animal" etc.) for which classification among at least some related sub-concepts is to be performed in one embodiment. The structured data source 406 may comprise semantic information about related concepts in some embodiments, e.g., in the form of a lexical database or ontology, and may also be referred to as a semantic data source. In one embodiment, the structured data source 406 may identify different "senses" for the same word. For example, the word "jaguar" may be identified as an animal according to one sense, and as a car according to another sense. As another example, the word "bear" may be identified as an animal according to one sense and as a toy (e.g., in the form of "teddy bear") according to another sense. For each of the identified senses, the structured data source 406 may identify other words that are part of the same sense. For example, the word "bear" may be identified with "mammal", "vertebrate", "animal" etc.

After related words to seed words have been identified using the structured data source 406, in one embodiment the related words may be provided to a parser, such as the knowledge parser 410 that may be used to select, filter, add, or limit the senses and or words that are associated with a particular class. For example, in some embodiments one or more senses may be removed from a particular class (e.g., to limit the understanding of the word "jaguar" to "animal" instead of to both "animal" and "car") using a sense limiter component not shown in FIG. 4. In one embodiment the knowledge parser 410 may also or instead be used to normalize the related words for the particular sense(s) selected. For example, the knowledge parser may modify (e.g., remove, add, edit) the related words received from the structured data source such that the words include a desired set of classes for objects to be identified within a set of images. In one embodiment, for example, the knowledge parser 410 may modify the words or tokens produced by the structured data source 406 to match existing tags of a tag database that may be used to identify objects within digital images.

The output of the knowledge parser 410 may be provided as input to a sparse knowledge graph generator 414 in the depicted embodiment. A sparse knowledge graph which includes pairs of nodes with direct connections between the seed word and the other words may be created in some embodiments by the sparse knowledge graph generator. For example, in one sparse knowledge graph, the word "bear" may be directly connected with each of the words "carnivore", "mammal", "vertebrate", "animal," and the like. In one embodiment, the sparse knowledge graph may also comprise other nodes which may not necessarily have been provided by the structured data source 406—e.g., words or terms may be obtained from additional sources to prepare the sparse knowledge graph. For example, in one embodiment the word "canine" (not determined using the structured data source) may be directly connected with the word "animal" (determined from the structured data source). In some embodiments, a connection may be removed or added from the sparse knowledge graph using override interfaces or mechanisms, e.g., by other natural language processing subsystems or by subject matter experts. In one embodiment, when creating the sparse knowledge graph, information about relationships or senses that are not relevant to a particular problem domain of interest may be pruned, thereby reducing the total number of links.

In the depicted embodiment, a tree generator 418 may combine linked pairs of words/terms of the sparse knowledge graph to generate a set of trees. If, for example, a seed word W1 is linked to a child word W2 in the sparse knowledge graph, and W2 itself is linked to another word W3, a tree in which W1 is the parent of W2, and W2 is the parent of W3 may be generated. The dense knowledge graph generator 422 may flatten the hierarchy of the tree version of the knowledge graph in the depicted embodiment, and provide the flattened or dense knowledge graph 450 to the training resources 426 for a neural network or machine learning model. Instead of having many hierarchical levels, the dense knowledge graph may in some embodiments have as few as two levels. In one such embodiment, the first level may include seed words 402, and the second level may include other related words identified thus far in the knowledge graph generation procedure. In the above example, seed word W1 may be directly linked in the dense knowledge graph to W2 (with some numerical weight p assigned to the W1-W2 link indicating the strength of the relationship) and also to W3 (with some numerical weight q indicating the strength of the W1-W3 relationship, which may be smaller than p since W3 is semantically more distant from W1 than W2). In some embodiments, respective weights indicating the strengths of the relationships may be included in the dense knowledge graph. In one embodiment, the dense knowledge graph may indicate at least the following types of relationships among classes corresponding to respective nodes: ancestor relationships, descendant relationships, sibling relationships, synonym relationships, or no relationship (for unrelated terms/words). In one embodiment, the strengths of the relationships between pairs of classes included in a knowledge graph may be encoded as, or represented by, a square semantic distance matrix with each of the classes represented by a respective row and column, and a numerical score at element [j, k] of the matrix indicating the strength of the semantic relationship between the word/term corresponding to the jth and kth rows/columns. In one embodiment, the score for the [j, k] element of the matrix may differ from the score of the [k, j] element, indicating the strength of the relationship may differ depending on whether the jth word is being analyzed with respect to the kth word, or vice versa. In other embodiments, the relationship between a given pair of terms or words may be assumed to be symmetric, so the [j, k] element of the semantic distance matrix may be identical to the [k, j] element. In one embodiment, a knowledge graph may comprise one or more directed acyclic graphs (DAGs), and may not necessarily be comprised of trees as such.

It is noted that semantic relationship information between classes may be encoded into graphs and associated numerical values using techniques other than those described above with respect to dense knowledge graphs in some embodiments. In one embodiment, for example, sparse knowledge graphs and/or trees with multiple levels may be used, rather than dense knowledge graphs with two levels. In some embodiments, data structures other than graphs or trees may be used to represent semantic relationships. In one embodiment, knowledge graphs may be rebuilt and/or refined over time, e.g., in response to feedback received from clients on whose behalf classification operations are performed, and/or in response to changes at structured data sources 406.

Semantically Weighted Loss Vector

Figure 5:
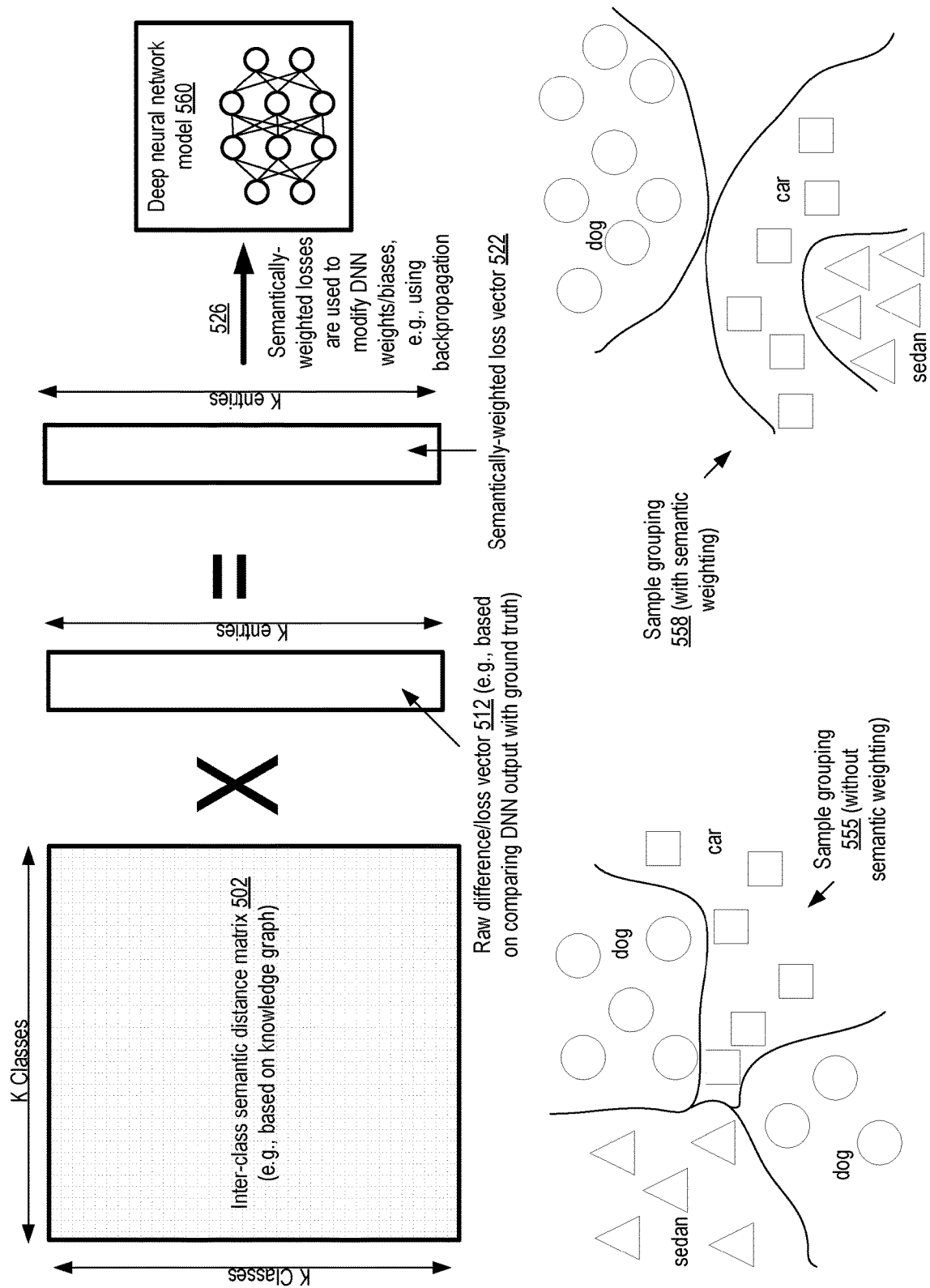
FIG. 5 illustrates an example technique which may be employed to compute a semantically weighted loss vector for a classifier, and an example of the types of classification improvements which may result from the use of such a vector, according to at least some embodiments.

FIG. 5 illustrates an example technique which may be employed to compute a semantically weighted loss vector for a classifier, and an example of the types of classification improvements which may result from the use of such a technique, according to at least some embodiments. In at least one embodiment, with respect to a given input observation record analyzed during a given iteration of training of the neural network model, a raw or baseline difference vector 512 may be computed. The baseline loss/difference vector may, for example, be obtained by subtracting respective classification score results for the set of K classes being considered by a classifier, from the ground truth vector corresponding to the observation record in some embodiments. The baseline vector 512 may be multiplied with a K x K semantic distance vector 502 obtained for example from a knowledge graph generation subsystem as discussed above, to obtain a semantically-weighted loss vector 522 in the depicted embodiment. The weighted loss vector 522 may in turn be used to modify various parameters such as weights and/or biases at various layers of the neural network, e.g., using backpropagation or other similar techniques in one embodiment. In at least some embodiments, the use of semantic relationship information in parameter modification may in effect reduce penalties for classification errors in which a class C1 is mistakenly recognized or identified for a semantically similar class C2, relative to the penalties for classification errors in which the class C1 is mistakenly identified or recognized for a semantically dissimilar class C3. Examples of such penalty variations are discussed below in the context of FIG. 6.

In some embodiments, using semantic information in a manner similar to the use of distance matrix 502, a cleaner separation between classes may be obtained than when such semantic information is not used. Sample grouping 555 shows a representation of the inter-class hyperplanes that may be determined between classes "dog", "car" and "sedan" in an environment in which semantic weighting is not used. Because semantic weighting is not used, the fact that a sedan is a type of car, and hence that the terms "car" and "sedan" are closely related, may not be taken into account when computing the penalties used for classification errors in the embodiment in which sample grouping 555 is generated. In contrast, in one embodiment sample grouping 558 may be achieved (for the same data set illustrated in grouping 555) using semantic weighting of the kind discussed above. As a consequence of the use of semantic information in grouping 558, examples of the "sedan" class may be categorized as a sub-group of the "car" class, while the "dog" class examples may be identified as clearly separate from the "car" and "sedan" classes.

The improved grouping and sub-grouping enabled by the use of semantic relationship information may help provide better search responses in some embodiments. For example, in one embodiment, an image management service at which semantic relationship information is used during training of a neural network may receive a search request for an object similar to a specified object, such as a Siamese cat, indicated in a first input observation or image. Internally, using the trained neural network model with the semantic information incorporated within it, the service may generate a feature vector corresponding to the image depicting the Siamese cat, and compare that feature vector to feature vectors associated with previously-analyzed images. Because of the use of semantic information during the training of the neural network, the feature vectors may comprise information that can be used to identify other observations that represent classes which are semantically similar. In one example scenario, even if the image management service does not find another image with a Siamese cat, the fact that the class "Siamese cat" is semantically close to other cat-related classes such as "Persian cat" may enable examples of the similar classes to be found (e.g., based on similar feature vectors) and returned in response to the search request for images of Siamese cats. Thus, instead of responding with an exact match for a search query, a search result may provide examples of related objects (objects which belong to semantically similar classes, not necessarily the exact class of the searched-for object) in some embodiments using the semantic information incorporated in the feature vectors produced at one or more layers of the neural network. Similarly, responses to other types of queries or requests may also be improved as a result of the semantically-oriented sub-class and class grouping in various embodiments.

Example Semantically Weighted Penalties

Figure 6:
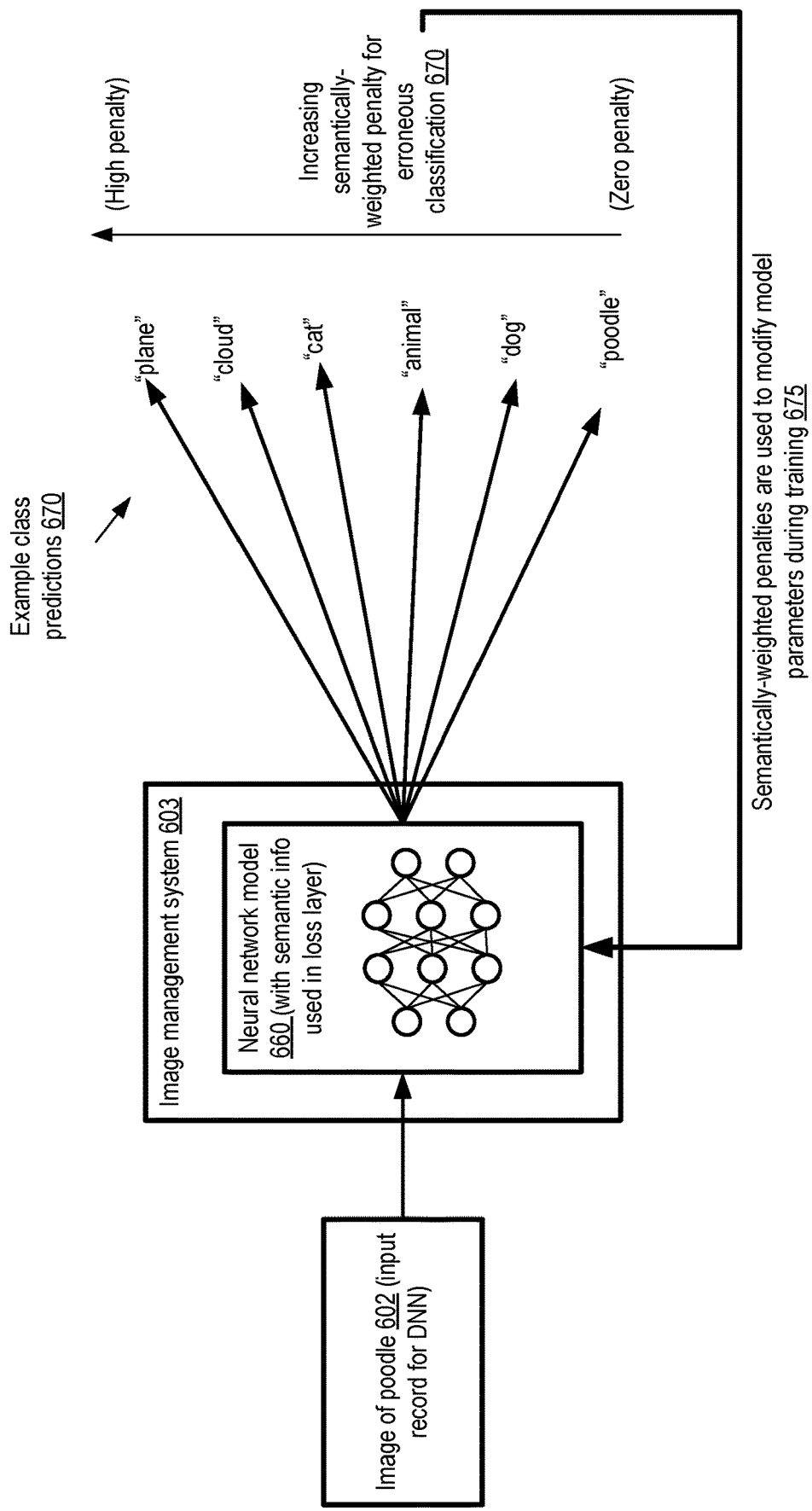
FIG. 6 illustrates examples of semantically-weighted penalties which may be applied for classification errors, according to at least some embodiments.

FIG. 6 illustrates examples of semantically-weighted penalties which may be applied for classification errors, according to at least some embodiments. In the depicted embodiment, an image management system 603 may comprise a neural network model 660 in which semantic information (e.g., in the form of a semantic distance matrix of the type discussed above, or in the form of another representation of a knowledge graph) may be incorporated within the neural network's loss layer.

An image of a poodle (a breed of dog) 602 may be provided as input during training of the neural network model 660 in the depicted embodiment. Example class predictions 670 for the image 602 may include, among others, the classes "poodle", "dog", "animal", "cloud", "cat" and "plane" in the depicted example scenario. Each of these classes 670 may have non-zero scores predicted by the model 660 in the training iteration being considered. Based on semantic distance information provided to the neural network training resources in the depicted embodiment, the respective penalties (shown along the arrow 670) associated with the classes shown may vary from a high penalty for "plane" (the highest penalty among the six classes) to the lowest penalty for the correct identification of "poodle". Because a poodle is a kind of dog, and a dog is a kind of animal, the penalty for identifying a dog in the image 602 may be lower than the penalty for identifying an animal. As a cat is an animal, the penalties for cat and animal may be similar in the depicted embodiment, while the penalties for misidentifying the poodle as a cloud or a plane may be the highest, as those classes are semantically most different (among the six classes shown) from the poodle category. As indicated by arrow 675, the semantically-weighted penalties may be used to modify model parameters (e.g., weights or biases at nodes of one or more layers of the model 660) during training in the depicted embodiment.

Programmatic Interactions

Figure 7:
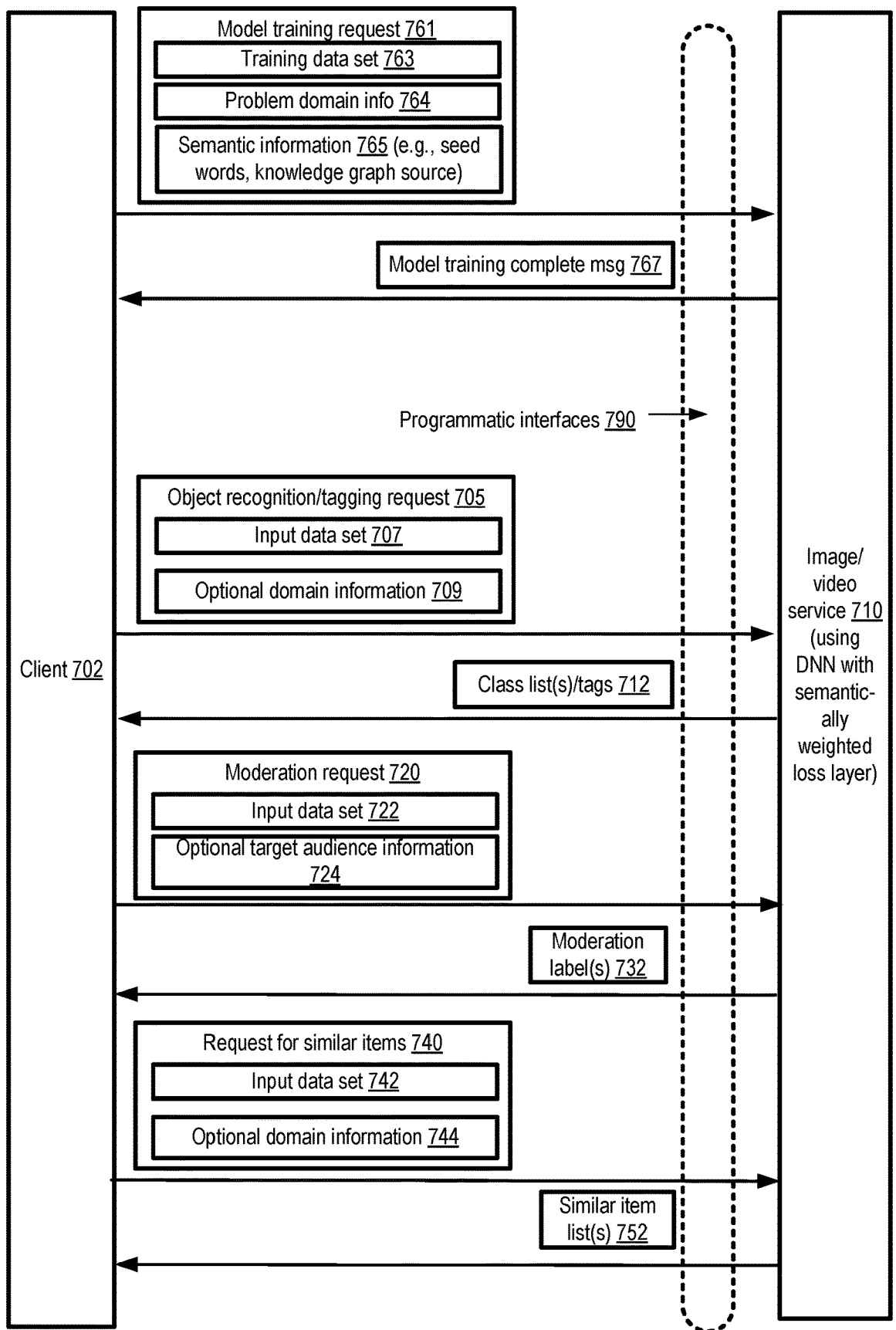
FIG. 7 illustrates examples of programmatic interactions between clients and a service at which a deep neural network with a semantically weighted loss layer may be used for classification, according to at least some embodiments.

FIG. 7 illustrates examples of programmatic interactions between clients and a service at which a deep neural network with a semantically weighted loss layer may be used for classification, according to at least some embodiments. In the depicted embodiment, an image/video management service 710 which uses a deep neural network with a semantically weighted loss layer as a classifier may implement one or more programmatic interfaces 790 for use by clients 702. The programmatic interfaces 790 may, for example, include a set of one or more application programming interfaces (APIs), a web-based console, command-line tools, and/or graphical user interfaces.

In some embodiments, a client 702 may submit several different types of requests via the programmatic interfaces 790 to the service 710. A request 761 to train a DNN model for a particular problem domain may be submitted in one embodiment by a client, indicating for example a training data set 762 (e.g., a pointer to a collection of labeled image files may be provided), problem domain information 763 (e.g., at least some classes into which the input data may be categorized), and/or semantic information 764 such as a set of seed words to be used to generate a knowledge graph of the kind discussed earlier, a source from which the knowledge graph may be obtained etc. In other embodiments, additional parameters may be included in the model training request 761, such as guidance regarding the type of model to be trained, various meta-parameter values, resource constraints for the training, and so on. Alternatively, in one embodiment fewer parameters may be provided—e.g., the client may simply indicate a problem domain, and leave the selection of semantic information sources and other decisions to the service 710. In some embodiments, after a model or classifier for the request problem domain has been trained, the image/video management service 710 may transmit a response message 767 indicating that the model's training phase is complete.

After the model with a semantically-weighted loss layer has been trained for a particular problem domain (e.g., either in response to client requests such as request 761, or by the image/video management service without explicit client requests), the model may be utilized to respond to requests pertaining to previously unseen input observations in the depicted embodiment. In one embodiment, a client 702 may submit a programmatic object recognition or tagging request 705 to the service, indicating one or more input observations as an input data set 707. In some embodiment, for example in a scenario in which the service has a number of different models trained for respective problem domains (e.g., general-purpose object recognition, object recognition within an album of personal photographs, medical-related object recognition, suspicious activity detection, moderation of potentially unsuitable images, etc.), an indication of the domain 709 associated with the request 705 may be provided, so that the right model can be used to respond. A list of classes or tags 712 identified by the model in the input data set 707 may be transmitted to the client in response to a request 705 in the depicted embodiment. In one implementation, an indication (such as a graph) of the hierarchical relationships between the identified classes/tags may also or instead be provided.

In at least one embodiment, a machine learning model such as a DNN may be trained at an image/video management service to determine whether a given input image or video is suitable for viewing by a particular type of audience. In one such embodiment, a moderation request 720 may be submitted to the service 710, indicating an input data set 722 to be analyzed for suitability for a target audience. In some embodiments, the moderation request may optionally include information about the target audience(s) 724 on whose behalf the analysis is to be performed. In response, the service 710 may use the trained machine learning model to determine a respective set of classes which are potentially represented in individual images or videos of the input data set. If the identified classes of a given image or video meet a disqualification criterion for viewing acceptability for a target audience, a moderation label 732 indicating that the image/video should not be viewed may be generated in some embodiments; otherwise, a moderation label 732 indicating that the image/video is acceptable may be generated and provided to the client. In one embodiment in which the service is used for moderation, a portion of a knowledge graph indicating a set of unacceptable classes may be provided as input during the training of the model. In some embodiments, a list of object or concept classes associated with different moderation labels such as "safe-to-view", "offensive", "explicit", "violent" etc. may be maintained at the service, and scores associated with one or more labels for a given image or video may be generated and provided to a client.

In at least some embodiments, the image/video management service 710 may provide a programmatic interface for clients 702 to submit similarity requests. A request 740 for items similar to those that are identified within a specified input data set 742 may be processed using a machine learning model with a semantically-weighted loss layer in the depicted embodiment. Optional domain information 744 which may be used to select a particular model from a group of models trained for different applications may be provided in the request 740 for similar items. The model may determine scores associated with one or more classes whose examples have been identified in the input data set in some embodiments. The scores may be compared with those of other input data sets analyzed previously, and data sets whose scores are similar may be identified in similar items list(s) 752 sent in response to the request 740 in the depicted embodiment.

In some embodiments, other types of programmatic requests than those shown in FIG. 7 may be processed using the trained DNN. In one embodiment, for example, images which match provided labels or class names may be provided in response to respective queries. For example, a client 702 may submit a query indicating a target class "sunset" to the service 710, and a set of images of sunsets or other related concepts may be provided in response. In some embodiments, the trained neural network may be used to provide hierarchical relationship information about classes of objects which may be recognized within input data in response to a programmatic request—e.g., together with the list of identified classes, a graph indicating hierarchical relationships among the identified classes may be provided. In some embodiments, respective confidence scores associated with different classes may be provided as part of the output of the trained model. In one embodiment, knowledge graphs and/or other representations of semantic relationships among concepts or classes may be rebuilt and/or refined over time, e.g., in response to feedback received from clients 702 (e.g., if a client indicates that a tag or label has been misapplied, or suggests a new tag/label), and/or in response to changes at semantic data sources (as may occur when new words or usages become accepted in a language).

It is noted that machine learning models with semantically weighted loss layers or functions may be used for a variety of applications in different embodiments. The applications associated with image/video processing indicated in FIG. 7 are examples and are not intended to imply that such models cannot be used for other types of applications in various embodiments.

Provider Network Environment

Figure 8:
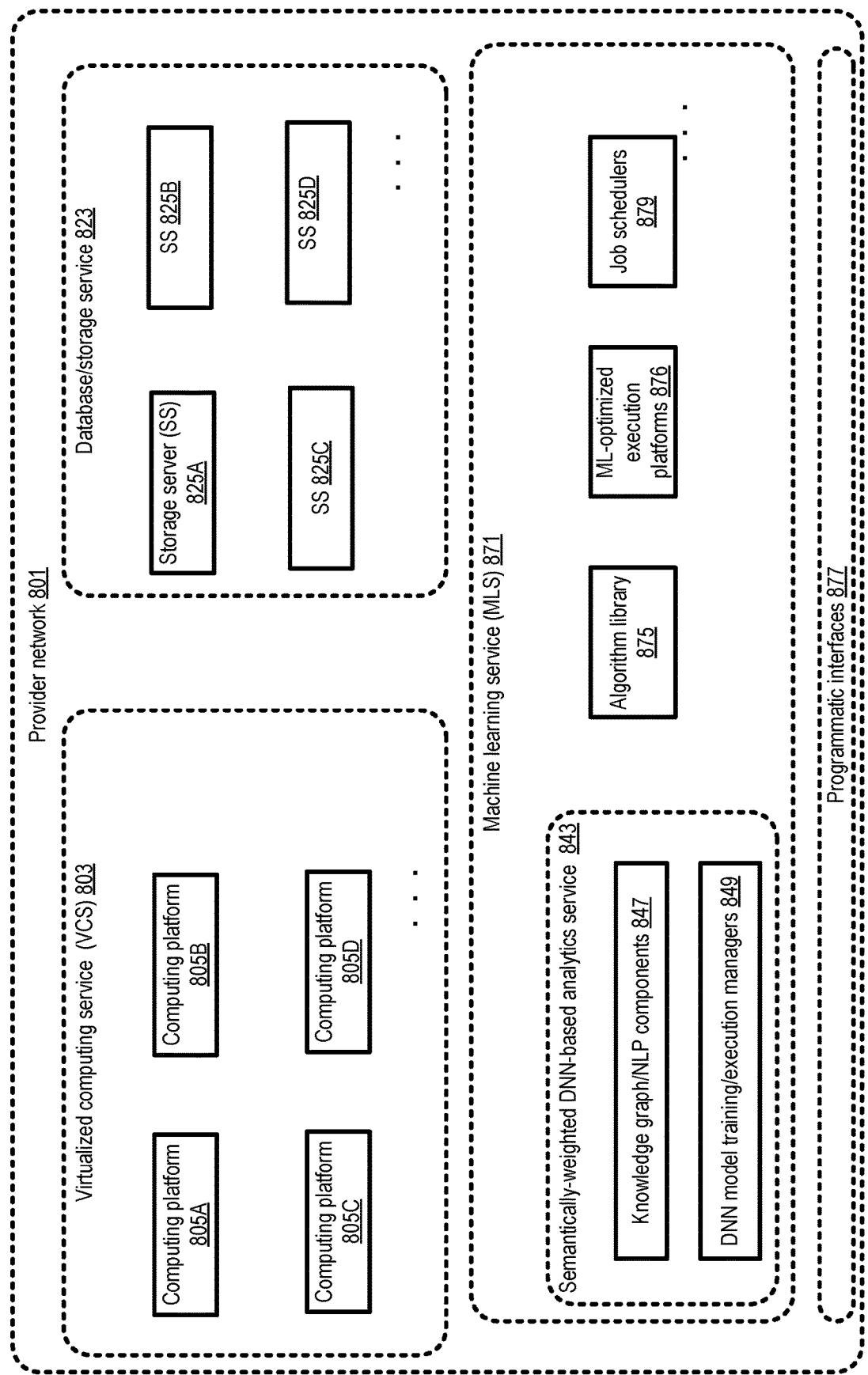
FIG. 8 illustrates an example provide network environment at which classification using a deep neural network with a semantically weighted loss function may be implemented, according to at least some embodiments.

FIG. 8 illustrates an example provide network environment at which classification using a deep neural network with a semantically weighted loss function may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtual computing service 803, a database or storage service 823, and a machine learning service 871 at which a semantically-weighted DNN-based analytics service 843 may be implemented as a subcomponent. Components of a given service may utilize components of other services in the depicted embodiment— e.g., for some machine learning tasks, a component of the machine learning service 871 may utilize virtual machines implemented at computing platforms such as 805A-805D of the virtualized computing service. Input data, intermediate results, final results and/or other artifacts of various machine learning algorithms or models may be stored at storage servers 825 (e.g., 825A-825D) of the database or storage service 823 in some embodiments. Individual ones of the services shown in FIG. 8 may implement a respective set of programmatic interfaces 877 which can be used by external and/or internal clients (where the internal clients may comprise components of other services) in the depicted embodiment.

As shown, the analytics service 843 may comprise, among other components, one or more DNN model training/execution managers 849 as well as one or more knowledge graph or natural language processing (NLP) components 847 in the depicted embodiment. The DNN model training/execution managers 849 as well as the knowledge graph/NLP components 847 may, for example, invoke algorithms selected from the machine learning algorithm library 875 in some embodiments. In one embodiment, requests to train machine learning models such as the DNN models may be handled as batch jobs at the machine learning service, and a batch job scheduler 879 may orchestrate the allocation of resources for the jobs as well as dependencies among jobs. In at least one embodiment, a machine learning service 871 may have access to or include a set of execution platforms 876 that are optimized for machine learning tasks (e.g., platforms that have customized hardware such as GPU arrays and/or customized software stacks). Depending on the suitability of such platforms for DNNs, execution platforms 876 may be employed for the training and post-training execution of DNN models for semantically-oriented classification tasks in the depicted embodiment.

After the model or models to be used for classification using semantic information have been trained, the trained model may be executed at the request of a model execution manager 847 in the depicted embodiment to analyze input data sets and/or to respond to some of the kinds of requests discussed above in the context of FIG. 7. In at least some embodiments, the model training and execution may be accomplished using non-specialized computing platforms of the virtualized computing service. In various embodiments, the training and test/evaluation data used for the DNN models may be stored at a database/storage service 823.

As mentioned earlier, the techniques for incorporating semantic relationship information into classifiers and/or other machine learning models described earlier may be implemented without acquiring resources of network-accessible services such as those shown in FIG. 8 in at least some embodiments. For example, a standalone tool implemented at one or more computing devices which are not part of a network-accessible service may be used in some embodiments.

Methods for Implementing Semantically Weighted Neural Networks

Figure 9:
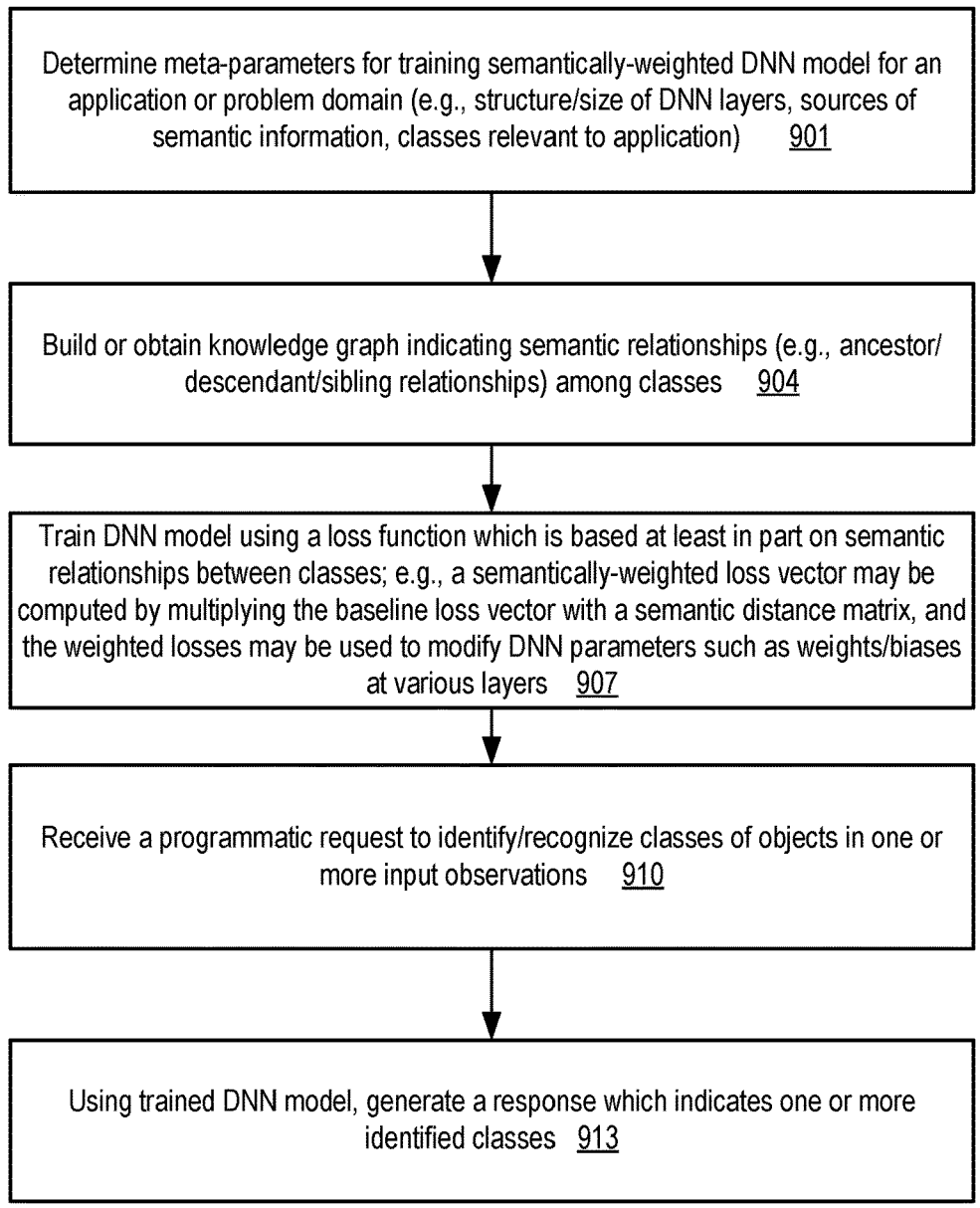
FIG. 9 is a flow diagram illustrating aspects of operations that may be implemented to perform classification using a semantically weighted loss function, according to at least some embodiments.

FIG. 9 is a flow diagram illustrating aspects of operations that may be implemented to perform classification using a semantically weighted loss function, according to at least some embodiments. As shown in element 901, a set of meta-parameters for training a semantically-weighted DNN model for an application or problem domain may be selected in one embodiment. The meta-parameters may include, among others, the structure and/or size (e.g., numbers of nodes or artificial neurons) of various DNN layers, the sources from which semantic information such as a semantic distance metric is to be obtained, an initial set of classes or categories relevant to the application or problem domain, and so on in various embodiments. In embodiments in which the semantic information is to be used for image-related applications, for example, a DNN which includes some number of convolution layers, some number of pooling layers, and/or some number of fully connected layers and a loss layer may be used, and the meta-parameters values may indicate the structures and counts of each of the layers. In at least one embodiment, several different DNN models with different meta-parameter settings may be trained in parallel, e.g., using respective training resources of a machine learning service of a provider network.

A data structure such as a knowledge graph indicating semantic relationships among pairs of classes may be constructed or obtained in the depicted embodiment (element 904). In at least some embodiments, a semantic distance matrix may be used to quantify the similarities or differences between different classes, with a smaller semantic difference score indicating that two classes are similar to one another, and a larger semantic difference score indicating that two classes are dissimilar. (In some embodiments, a semantic similarity matrix rather than a distance matrix may be used, in which smaller scores indicate greater dissimilarities and larger scores indicate greater similarities).

In at least some embodiments, a DNN model with a loss function which is based at least in part on semantic relationships between classes may be trained (element 907). For example, in one embodiment, a semantically-weighted loss vector may be computed by multiplying baseline or raw loss values with a semantic distance matrix, and the semantically-weighted loss vector may be used to modify parameters at various layers of the DNN model such as weights and biases associated with the nodes of the different layers. A backpropagation technique may be used in at least some embodiments to modify the parameters at the different DNN layers. In one embodiment, a machine learning model which does not necessarily include DNNs may be trained using a loss function which incorporates semantic information.

A programmatic request to identify or recognize classes of objects or concepts in one or more input observations may be received in one embodiment (element 910), e.g., at a network-accessible service of a provider network. Using the trained DNN model, a response which indicates one or more classes identified in the input may be generated and provided to the requester in some embodiments (element 913). In some embodiments, a trained DNN model incorporating semantic information in its loss layer may be employed for a variety of applications, e.g., for moderating images/videos, similar item identification, and so on, and such a model may not be restricted simply to identifying or recognizing classes as such.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Illustrative Computer System

Figure 10:
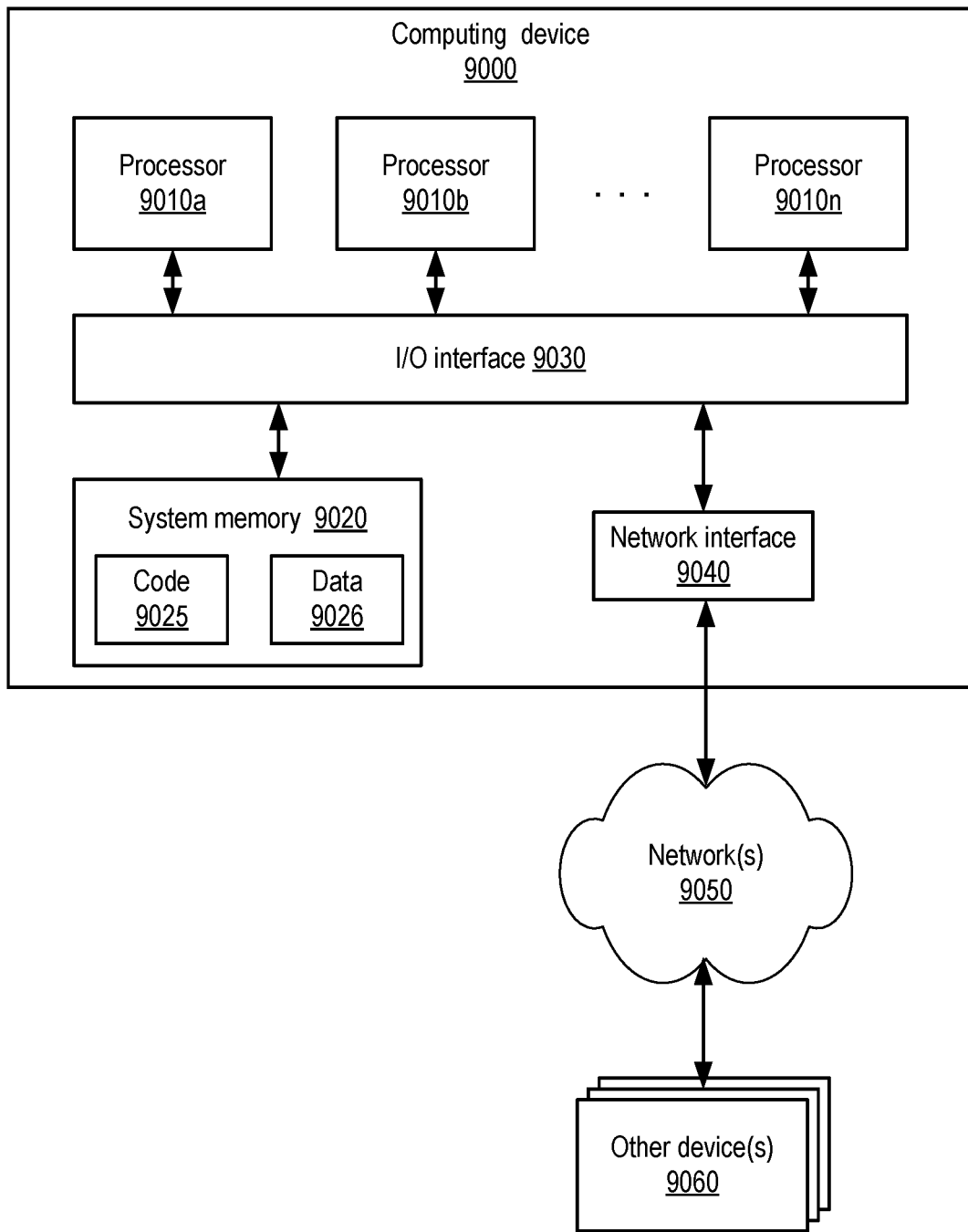
FIG. 10 is a block diagram illustrating an example computing device that may be used in at least some embodiments.

In at least some embodiments, a server that implements one or more of the techniques described above for training and using machine learning models which use semantic information in their loss functions may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
obtaining an indication of semantic relationships among a plurality of classes, wherein the indication includes a matrix representing closeness of semantic relationships between individual ones of the plurality of classes;
training a neural network using a loss function, wherein determination of a loss for a training observation during training of the neural network includes computing a difference vector between (a) an output vector of a particular layer of the neural network for the training observation and (b) a ground truth vector corresponding to the training observation, and multiplying the difference vector between the output vector and the ground truth vector with the matrix representing the closeness of semantic relationships between the individual ones of the plurality of classes; and
identifying, using the trained neural network, one or more classes to which an input observation belongs.

2. The method as recited in claim 1, wherein the matrix comprises a matrix of semantic distance values corresponding to pairs of the individual classes of the plurality of classes.

3. The method as recited in claim 2, wherein
multiplying the difference vector with the matrix generates a semantically weighted loss vector; and
wherein said training the neural network comprises:
modifying one or more parameters of one or more layers of the neural network based at least in part on the semantically weighted loss vector.

4. The method as recited in claim 1, wherein the neural network comprises one or more convolutional layers, one or more pooling layers, and one or more fully-connected layers.

5. The method as recited in claim 1, further comprising:
obtaining an indication of a plurality of seed terms;
generating, using the plurality of seed terms and one or more semantic data sources, a knowledge graph, wherein said indication of semantic relationships comprises at least a portion of the knowledge graph.

6. The method as recited in claim 1, further comprising:
obtaining an indication, via a programmatic interface, of one or more target classes into which a first set of input observations is to be classified;
identifying, using the indication of semantic relationships and the one or more target classes, a training coverage set comprising one or more labels; and
generating a training data set which includes at least one training example corresponding to individual ones of the one or more labels, wherein said training the model comprises using the training data set.

7. The method as recited in claim 1, further comprising:
obtaining, at an image management service of a provider network, a representation of a first image; and
utilizing the trained neural network to generate a tag for the first image.

8. The method as recited in claim 7, further comprising:
receiving, via a programmatic interface, a query to identify images similar to the first image;
utilizing the semantic relationships to identify one or more additional tags associated with images of an image collection, wherein the one or more additional tags were associated with the images of the image collection using the trained neural network; and
providing, in response to the query, one or more images selected using the one or more additional tags.

9. The method as recited in claim 1, further comprising:
receiving, via a programmatic interface, a query indicating one or more target classes; and
providing, in response to the query, an image for which a target class of the one or more target classes was determined using the neural network.

10. The method as recited in claim 1, further comprising:
determining, using the trained neural network in response to an image moderation request received via a programmatic interface, a moderation label associated with an image; and
providing the moderation label to a destination.

11. A system, comprising:
one or more processors; and
memory storing program instructions that, when executed on or across the one or more processors, cause the one or more processors to:
obtain an indication of semantic relationships among a plurality of classes, wherein the indication includes a matrix representing closeness of semantic relationships between individual ones of the plurality of classes;
train a neural network using a loss function, wherein determination of a loss for a training observation during training of the neural network includes computing a difference vector between (a) an output vector of a particular layer of the neural network for the training observation and (b) a ground truth vector corresponding to the training observation, and multiplying the difference vector between the output vector and the ground truth vector with the matrix representing the closeness of semantic relationships between the individual ones of the plurality of classes; and
identify, using the trained neural network, one or more classes to which an input observation belongs.

12. The system as recited in claim 11, wherein the matrix comprises a matrix of semantic distance values corresponding to pairs of the individual classes of the plurality of classes.

13. The system as recited in claim 12, wherein
multiplying the difference vector with the matrix generates a semantically weighted loss vector; and
wherein to train the neural network, the program instructions, when executed, cause the one or more processors to:
modify one or more parameters of one or more layers of the neural network based at least in part on the semantically weighted loss vector.

14. The system as recited in claim 11, wherein the neural network comprises one or more of: (a) a convolutional layer, (b) a pooling layer, or (c) a fully-connected layer.

15. The system as recited in claim 11, wherein the program instructions, if executed, cause the one or more processors to:
identify a plurality of seed terms; and
generate, using the seed terms and one or more semantic data sources, a knowledge graph, wherein said indication of semantic relationships comprises at least a portion of the knowledge graph.

16. A non-transitory computer-accessible storage medium storing program instructions that when executed on one or more processors cause the one or more processors to perform a method comprising:

obtaining an indication of semantic relationships among a plurality of classes, wherein the indication includes a matrix representing closeness of semantic relationships between individual ones of the plurality of classes;

training a neural network using a loss function, wherein determination of a loss for a training observation during training of the neural network includes computing a difference vector between (a) an output vector of a particular layer of the neural network for the training observation and (b) a ground truth vector corresponding to the training observation, and multiplying the difference vector between the output vector and the ground truth vector with the matrix representing the closeness of semantic relationships between the individual ones of the plurality of classes; and identifying, using the trained neural network, one or more classes to which an input observation belongs.

17. The non-transitory computer-accessible storage medium as recited in claim 16, wherein the matrix comprises a matrix of semantic distance values corresponding to pairs of the individual classes of the plurality of classes.

18. The non-transitory computer-accessible storage medium as recited in claim 17, wherein multiplying the difference vector with the matrix generates a semantically weighted loss vector; and wherein said training the neural network comprises:

modifying one or more parameters of one or more layers of the neural network based at least in part on the semantically weighted loss vector.

19. The non-transitory computer-accessible storage medium as recited in claim 16, wherein said training the neural network comprises using a gradient descent algorithm.

20. The non-transitory computer-accessible storage medium as recited in claim 16, wherein the one or more classes comprise a first class and a second class, wherein the method further comprises:

providing, via a programmatic interface, an indication of one or more of: (a) a hierarchical relationship between the first class and the second class or (b) respective confidence scores associated with the first class and the second class.

21. The non-transitory computer-accessible storage medium as recited in claim 16, wherein the method further comprises:

in response to a search request for an object similar to a first object, wherein the first object is indicated in a first input observation:

identifying, using a first feature vector generated by the trained neural network model for the first input observation, a second object indicated in another input observation, wherein at least one class to which the second object belongs differs from at least one class to which the first object belongs; and providing an indication that a search result corresponding to the search request includes the second object.

* * * * *